No. 780,369. PATENTED JAN. 17, 1905.
J. DE MONTGOLFIER.
FRAME FOR MOTOR OR OTHER VEHICLES.
APPLICATION FILED FEB. 16, 1904.
2 SHEETS—SHEET 1.
Fig. 2
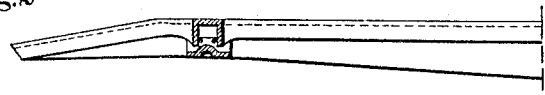
Fig. 3  Fig. 4  Fig. 5
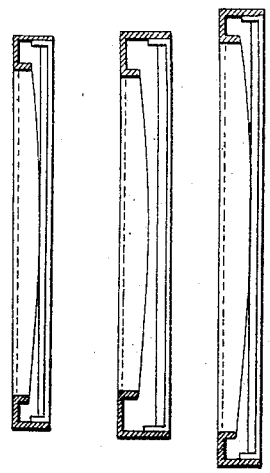
Fig. 1
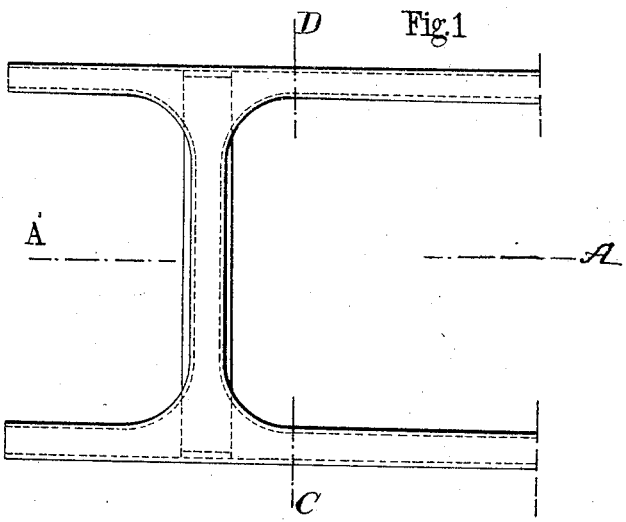
Fig. 7
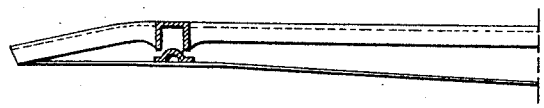
Fig. 8  Fig. 9
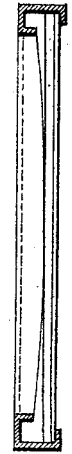
Fig. 6
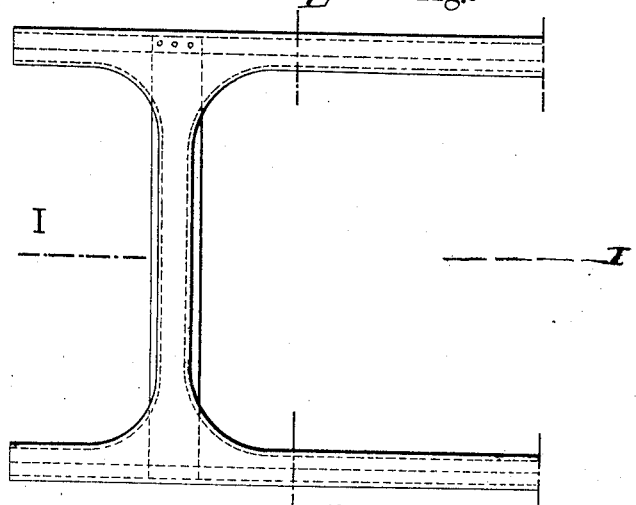
WITNESSES:
W. M. Avery
A. H. Davis
INVENTOR
Joseph de Montgolfier
BY
Munn & Co
ATTORNEYS No. 780,369. PATENTED JAN. 17, 1905.
J. DE MONTGOLFIER.
FRAME FOR MOTOR OR OTHER VEHICLES.
APPLICATION FILED FEB. 16, 1904.
2 SHEETS—SHEET 2.
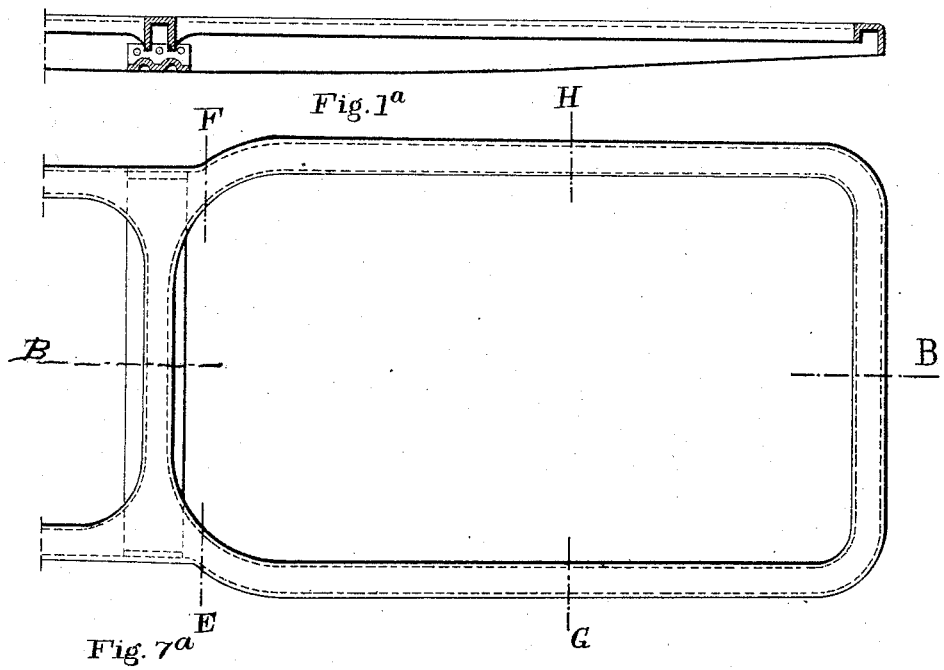
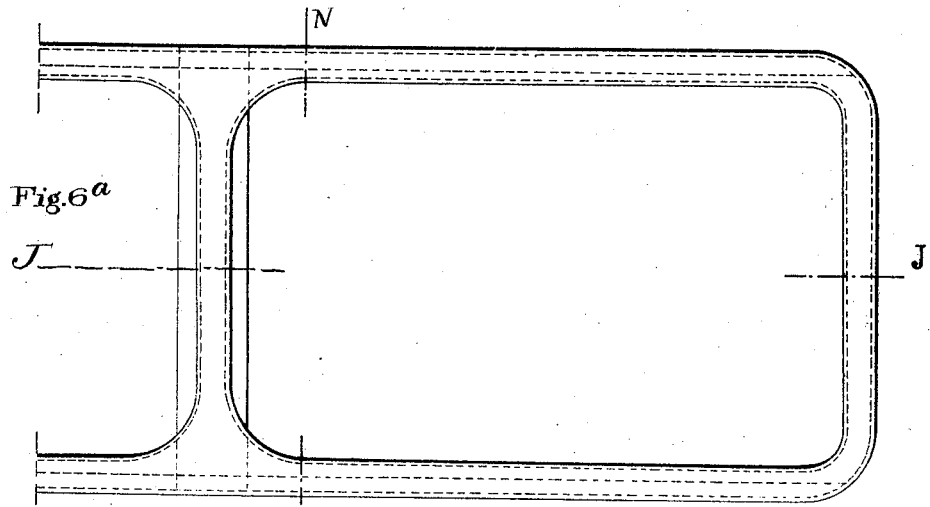
WITNESSES:
W. M. Avery
A. H. Davis
INVENTOR
Joseph de Montgolfier
BY Munn & Co
ATTORNEYS No. 780,369. Patented January 17, 1905.

UNITED STATES PATENT OFFICE.

JOSEPH DE MONTGOLFIER, OF PARIS, FRANCE.

FRAME FOR MOTOR OR OTHER VEHICLES.

SPECIFICATION forming part of Letters Patent No. 780,369, dated January 17, 1905.

Application filed February 16, 1904. Serial No. 193,881.

*To all whom it may concern:*

Be it known that I, JOSEPH DE MONTGOLFIER, a citizen of the French Republic, residing at 20 Rue des Pyramides, Paris, France, have invented certain new and useful Improvements Relating to Frames for Motor or other Vehicles, of which the following is a specification.

This invention has for its object an improved frame for motor and other vehicles of the same kind. These frames have hitherto been constructed either of reinforced wood or of brazed tubes or of rolled or stamped metal parts. All the component longitudinal or transverse members are assembled one with the other by means of various devices, such as angle-pieces, sockets, lugs, and the like.

This invention permits of dispensing with all assemblages of this kind, which tend to increase the cost of production, complicate the fitting, and augment the total weight. This object is attained by forming all the longitudinal and transverse members by stamping in a single suitably-recessed plate of sheet metal.

In the accompanying drawings, Figure 1 is a plan view of a portion of a stamped frame embodying my invention; and Fig. 1ª is a similar view of the other portion of the frame, being a continuation of Fig. 1. Fig. 2 is a longitudinal section on line A A of Fig. 1. Fig. 2ª is a similar view on line B B of Fig. 1ª. Fig. 3 is a transverse section on line C D of Fig. 1. Fig. 4 is a transverse section on line E F of Fig. 1ª. Fig. 5 is a transverse section on line G H of Fig. 1ª. Fig. 6 is a plan view of a portion of a modified form of stamped frame; and Fig. 6ª is a similar view of the other portion of the frame, being a continuation of Fig. 6. Fig. 7 is a longitudinal section on line I I of Fig. 6. Fig. 7ª is a similar view on line J J of Fig. 6ª. Fig. 8 is a transverse section on line K L of Fig. 6, and Fig. 9 is a transverse section on line M N of Fig. 6ª.

The manner in which these stamped frames for motor-vehicles and the like are formed will be obvious from an inspection of the drawings, from which it will be seen that the sheet of metal may either be bent along three faces perpendicularly, Figs. 1 and 1ª, or along four faces perpendicularly, Figs. 6 and 6ª. The sheet metal may be of any desired quality, thickness, and metal.

In addition to the advantages obtained which have been enumerated above the method of manufacture permits of forming the frame with any required deformation, curvature, recess, protuberance, or projection for the reception, support, or attachment of the various parts of the mechanism. In this manner certain supports which have hitherto been fitted to the frame are dispensed with.

The frames described and illustrated are particularly adapted for motor-vehicles; but they are also capable of utilization in vehicles of other kinds.

Having now particularly described and ascertained the nature of my said invention and in what manner the same is to be performed, what I claim is—

1. A frame for motor road-vehicles, comprising a square elongated frame having its members approximately U shape in cross-section, the side members being connected together by a number of cross members or bars, one bar being at one end of the side members, one at about the center of length of the members, and a third one a distance from the other ends of the said members, the whole being formed from a single piece of sheet metal.

2. A frame for motor road-vehicles, comprising a square elongated frame formed of integral longitudinal and transverse channel-bars, one side member of the channel of each bar being bent inwardly parallel with the connecting member of the side member of the channel, the longitudinal bars being connected by a number of transverse bars, one bar being at one end of the longitudinal bars, one at about the center of length of the bars, and a third one a distance from the other ends of said longitudinal bars.

In witness whereof I have hereunto set my hand in presence of two witnesses.

JOSEPH DE MONTGOLFIER.

Witnesses:
ARMAND PICARD,
HANSON C. COXE.